(12) United States Patent
Fritz et al.

(10) Patent No.: US 10,808,908 B2
(45) Date of Patent: Oct. 20, 2020

(54) LIGHTING DEVICE AND REARVIEW DEVICE FOR VEHICLES

(71) Applicant: SMR Patents S.à.r.l., Luxembourg (LU)

(72) Inventors: Daniel Fritz, Stuttgart (DE); Eugen Meier, Ditzingen (DE); Oliver Schmidt, Stuttgart (DE); Raimund Negel, Unterensingen (DE)

(73) Assignee: SMR Patents S.à.r.l., Luxembourg (LU)

( * ) Notice: Subject to any disclaimer, the term of this patent is extended or adjusted under 35 U.S.C. 154(b) by 158 days.

(21) Appl. No.: 15/425,200

(22) Filed: Feb. 6, 2017

(65) Prior Publication Data

US 2017/0227187 A1    Aug. 10, 2017

(30) Foreign Application Priority Data

Feb. 4, 2016  (DE) .......................... 10 2016 101 997

(51) Int. Cl.
*F21S 43/31* (2018.01)
*B60Q 1/26* (2006.01)
*B60R 1/12* (2006.01)

(52) U.S. Cl.
CPC ............ *F21S 43/31* (2018.01); *B60Q 1/2665* (2013.01); *B60R 1/1207* (2013.01); *B60R 2001/1253* (2013.01)

(58) Field of Classification Search
CPC .......... F21S 43/31; F21S 43/315; F21S 43/14; F21S 43/33; F21S 43/235; F21S 43/236; F21S 43/237; F21S 43/239; F21S 43/241; B60Q 1/2665; B60Q 1/1207; B60Q 3/258; B60R 1/1207
See application file for complete search history.

(56) References Cited

U.S. PATENT DOCUMENTS

| 7,334,923 B2 | 2/2008 | Tanaka et al. |
| 8,529,109 B2 * | 9/2013 | Ohno ............... F21S 41/24 362/511 |
| 2002/0024808 A1 | 2/2002 | Suehiro et al. |

(Continued)

FOREIGN PATENT DOCUMENTS

| DE | 10 2004 015 544 A1 | 11/2004 | |
| EP | 1970736 A1 * | 9/2008 | ........... B60Q 1/2665 |

OTHER PUBLICATIONS

Search report dated Sep. 30, 2016 in connection with German Patent Application No. 10 2016 101 997.6.

*Primary Examiner* — Erin Kryukova
(74) *Attorney, Agent, or Firm* — Jones Day

(57) ABSTRACT

A lighting device for a visual display in a rearview device of a vehicle includes at least one light element, at least one reflecting element which is included on or in a support element of the lighting device and is adapted to reflect incident light from the light element, at least one absorption element which is included on or in the support element of the lighting device and is adapted to absorb incident light from the light element, and at least one light guide element which is included on or in the support element of the lighting device and is adapted to collect and guide incident light from the light element, where the support element, the reflecting element, the absorption element or the light guide element are at least partially curved away from the light element.

8 Claims, 3 Drawing Sheets

(56) References Cited

U.S. PATENT DOCUMENTS

| | | | |
|---|---|---|---|
| 2003/0206417 A1* | 11/2003 | Pastrick | B60Q 1/2665 362/494 |
| 2005/0117236 A1* | 6/2005 | Tanaka | B60Q 1/2665 359/876 |
| 2005/0219857 A1* | 10/2005 | Klett | B60Q 1/2665 362/518 |
| 2005/0276058 A1* | 12/2005 | Romas | B60Q 1/2665 362/494 |
| 2006/0215413 A1 | 9/2006 | Mathieu et al. | |
| 2006/0291225 A1* | 12/2006 | Todd | B60Q 1/2665 362/494 |
| 2008/0259620 A1* | 10/2008 | Oba | F21S 43/249 362/487 |
| 2009/0284365 A1* | 11/2009 | Wagner | B60Q 1/2665 340/465 |
| 2011/0058385 A1* | 3/2011 | Kazaoka et al. | |
| 2011/0170307 A1* | 7/2011 | Ishikawa | B60Q 1/2665 362/516 |
| 2012/0113660 A1* | 5/2012 | Ishikawa | B60Q 1/0088 362/494 |
| 2013/0051047 A1* | 2/2013 | Endoh | B60R 1/1207 362/494 |
| 2017/0028925 A1* | 2/2017 | Yokoyama | B60R 1/12 |

* cited by examiner

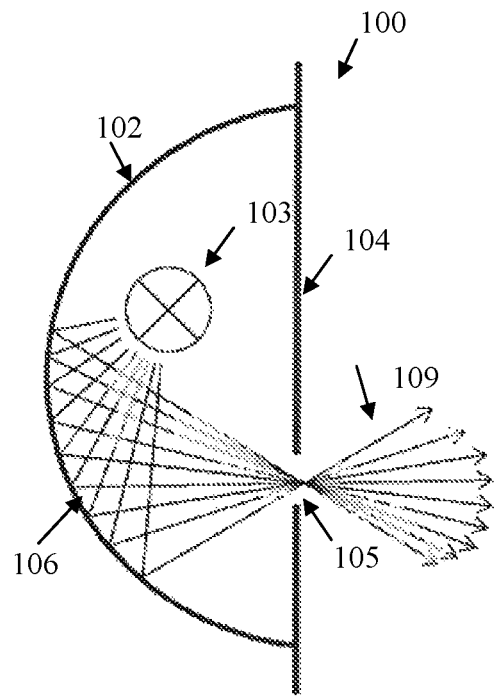
Fig. 1
PRIOR ART
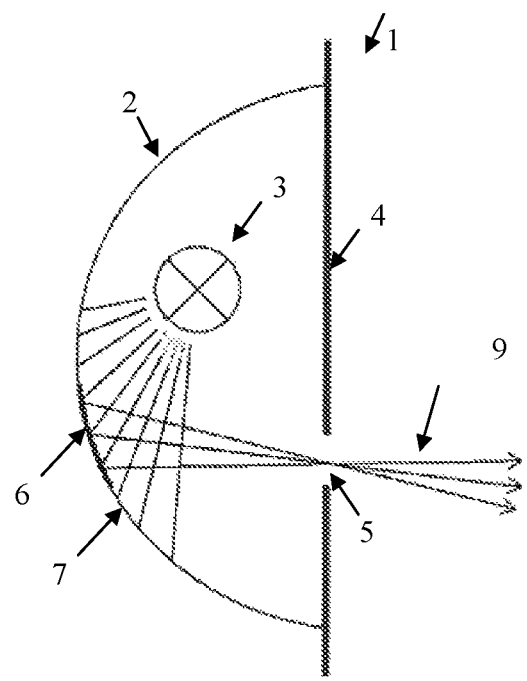
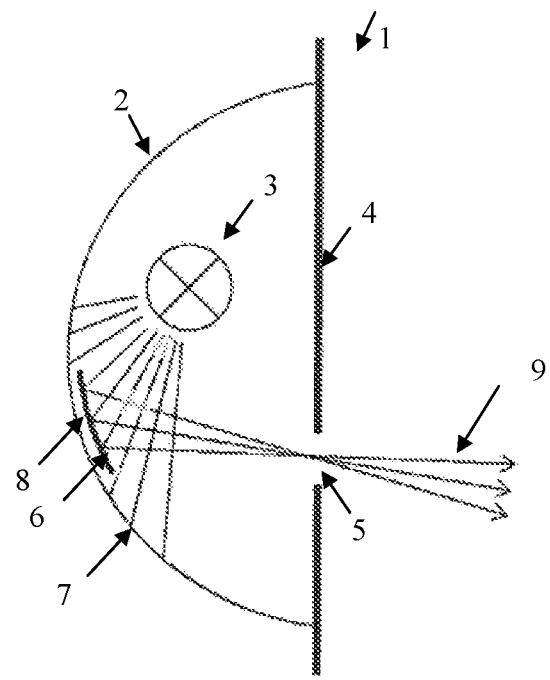
Fig. 2a
Fig. 2b

LIGHTING DEVICE AND REARVIEW DEVICE FOR VEHICLES

CROSS-REFERENCE TO RELATED APPLICATIONS

This application claims the benefit of priority of German Patent Application No. DE 10 2016 101 997.6, filed Feb. 4, 2016, the disclosure of which is incorporated herein by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to a lighting device for a visual display in a rearview device of a vehicle, preferably a motor vehicle, and to a rearview device for vehicles, preferably for motor vehicles, having such a lighting device.

2. Description of Related Art

Lighting devices for vehicles with visual displays which are arranged in a rearview device with a mirror element, and/or behind the mirror element, are known from EP 2 463 152 A1, by way of example. The mirror element has an opening for the transmission of light from the lighting device, and the visual display is used to transmit information to a driver. This information can be a warning indicating that objects are positioned in the blind spot of the mirror element, for example.

EP 1 970 736 A1 discloses a rearview mirror for vehicles, preferably for motor vehicles, which is provided with a mirror glass mounted on a carrier plate and a display unit arranged behind the mirror glass and the carrier plate. The display unit generates, by means of at least one illuminating means, a light beam which can be coupled into a light guide which is equipped with output optics, by means of which the light beam is deflected outwards by at least one at least partially reflection-free region of the mirror glass. Input optics—e.g. in the form of a collecting lens of the light guide—ensure that the light beams are guided parallel to each other in the light guide. A reflector is also present in the light guide in the beam path of the light beams, wherein the light beams are reflected on the same by total reflection in the direction of the reflection-free region of the mirror glass, the reflector having at least two reflecting surfaces on a reflection side of the light guide, between which are configured separation surfaces which substantially lie parallel to the substantially parallel light beams. The light beams deflected via the reflection side also arrive at the deflecting optics of the light guide, which consist essentially of deflecting surfaces arranged transversely to the light beams, said deflecting surfaces deflecting the light beams towards the driver, wherein separating surfaces lie between the deflection surfaces and run substantially parallel to the light beams.

Some of the lighting devices known from the prior art use a separate reflector which is curved outwards, wherein electromagnetic radiation, such as light, is reflected on the inner surface thereof. For example, U.S. Pat. No. 6,076,948 describes such a reflector, which is closed with a cover element which has an opening and is arranged behind the mirror surface of an exterior rearview mirror. A light element which emits light in a specific wavelength range is located in the curvature of the reflector. The light is reflected by the curved reflector and exits through the aperture in the cover element through the mirror surface of the exterior rearview mirror.

However, the lighting devices known in the prior art have the disadvantage that distortions can arise, in particular in the form of light irradiating in undesirable directions.

SUMMARY

The problem addressed by the present invention is that of providing a lighting device for a visual display in a rearview device of a vehicle, preferably of a motor vehicle, which does not have the disadvantages described above.

This problem is addressed by a lighting device for a visual display in a rearview device of a vehicle, preferably of a motor vehicle, having at least one light element; and having at least one reflecting element included on or in a support element of the lighting device, said support element adapted to reflect incident light from the light element; and having at least one absorption element included on or in the support element of the lighting device and adapted to absorb incident light from the light element. Alternatively or in addition to the absorption element, at least one light guide element is included according to the invention, which is included on or in the support element of the lighting device and is adapted to collect incident light from the light element and to guide it to the reflecting element. In addition, the support element, the at least one reflecting element, the at least one absorption element and/or the light guide element are at least partially curved away from the at least one light element. As a result of the curving-away, there is a bulging outwards—that is, a convex outer surface—on the side facing away from the light element.

The inner surface of the reflecting element facing the incident light of the light element can have a concave curvature and/or the inner surface of the absorption element facing the incident light of the light element can have a concave curvature and/or the inner surface of the light guide element facing the incident light of the light element can have a concave curvature. The concave curvature of the reflecting element, the absorption element and/or the light guide element can be at least segmentally spherical and/or aspherical.

By means of an aspherical reflecting surface, for example, it is possible to ideally illuminate a target surface, and/or to improve the input of light into a light guide element.

A concave curvature of the absorption element can be used to prevent re-emitted light from escaping from the lighting device through an opening.

A concave curvature of the light guide element has a collecting and/or scattering effect on the incident light. This can be used to obtain a desired illumination and substantially avoid distortions.

According to the invention, the inner surface of the reflecting element, the absorption element and/or the light guide element, which faces the incident light of the light element, is at least partially patterned and/or grained and/or the inner surface of the reflecting element, the absorption element, and/or the light guide element which faces the incident light of the light element is at least partially a light-scattering surface.

The term "grained surface" means a special surface texture resulting from a roughness of the surface which scatters incident light diffusely. The grained surface texture can be incorporated and/or attached into/onto the surface by means of, for example, a primary shaping process, such as casting, eroding, etching and milling, and/or by molding methods such as blasting, brushing and embossing, and/or coating processes such as gas phase deposition and varnishing. Preference is given in this case to the production of grained plastic parts by means of injection molding using an injection mold accordingly processed in advance. The term "grained surface" is used in this context also to mean regularly or irregularly arranged microoptics, but no milling traces and/or polishing traces.

Grained surfaces appear matte rather than glossy.

A grained surface of the reflecting element can lead to a more uniform illumination resulting from scattering of the light. It is advantageous if the surface of the reflecting element is at least partly grained, since the deflection of the light and, at the same time, the scattering of the light, can take place in a space-saving manner on one surface.

A grained surface of the absorbing element can scatter incident light and thus minimize extraneous light.

A grained surface of the light guide element can optimize the illumination by scattering the light.

The term "light scattering surface" is intended to denote a diffusely scattering surface which reflects only a fraction of the light back to the at least one light element. Advantageously, the light output of the lighting device is thereby increased. In contrast to a grained surface, the light-scattering surface can also scatter light without surface roughness, for example by using white dye.

The invention also proposes that the reflecting element reflects at least 35%, preferably at least 50% and most preferably at least 70%, of the radiation power of the light of the light element incident thereon, in particular in a directed and/or diffuse manner, and/or the absorption element absorbs at least 65%, preferably at least 75% and most preferably at least 95%, of the radiation power of the incident light of the light element.

In the lighting device, the at least one reflecting element can thus reflect in a directed and/or diffuse manner at least 35% of the radiation power incident on the reflecting element. A higher total degree of reflection, preferably at least 50%, or at least 60%, or at least 70% is advantageous for optical efficiency.

The at least one absorption element can absorb more than 65% of the radiation power incident on the absorption element in the lighting device. A higher total absorption rate, preferably at least 75%, or at least 85%, or at least 95%, is advantageous for the prevention of extraneous light.

In first embodiments of the invention, it is also preferred that the support element is curved at least in some areas, and the at least one reflecting element and/or the at least one absorption element is/are arranged on or in the inner surface of the support element in the region of the curvature, or the at least one reflecting element and/or the at least one absorption element has/have a curvature which preferably corresponds substantially to the curvature of the support element.

In second embodiments, it is preferred for the support element and the at least one light guide element to each be molded individually or together with at least one curvature, and for the at least one reflecting element and/or the at least one absorption element to be arranged on or in the curvature of the light guide element.

According to the invention, it is proposed that the support element be molded together with the reflecting element and/or absorption element. For example, in the case of an absorbing substrate and/or support element, a surface can be partially coated with a reflective layer at locations which interact with light.

Furthermore, according to the invention there can be an—especially interchangeable—cover element and/or diaphragm element which is transparent in at least one region and/or has an opening in at least one region, wherein the light-transmitting region and/or the opening determine a—particularly variable—illumination contour of the lighting device.

The cover element and/or diaphragm element in this case can be adapted to cover the region curved by the support element, preferably to cover the same opaquely; and/or it can have a reflecting surface on a side facing away from the support element.

The cover element and/or diaphragm element can also be connected or connectable to the support element, and/or a housing can be provided by the cover element and/or diaphragm element and the support element, which is preferably tight or sealed.

Furthermore, the invention proposes that the at least one reflecting element has a reflective, in particular highly reflective, material, or is coated with a reflective, in particular highly reflective, material, and/or the at least one reflecting element on its surface facing the at least one light element has a light-scattering surface structure at least in parts, and/or the at least one reflecting element is comprised by the support element or is connected to—particularly detachably—the support element, and/or the support element acts as the reflecting element, and/or the at least one reflecting element has a transition from a dielectric material to air.

In this case, the reflective material can comprise chromium and/or aluminum, and/or the dielectric material can comprise a plastic, in particular PMMA.

Lighting devices according to the invention can also be characterized in that the at least one absorption element is comprised by the support element or is connected to the support element, in particular detachably, or the support element acts as the at least one absorption element, and/or the at least one absorption element is at least partially reflective.

The at least one reflecting element and the at least one absorption element can be provided in or by an element.

In this case, the at least one reflecting element and the at least one absorption element can be arranged on opposite sides of a substrate or on different sides of the light guide element.

The substrate can be deformable, in particular bendable or foldable, wherein preferably the at least one reflecting element and the at least one absorption element, when provided on opposite sides of the substrate, can both face or do face the at least one light element.

For example, the lighting device can be arranged behind a rearview element in the form of a mirror surface of an inner or outer rearview mirror. The mirror surface can be translucent in this region so that light from the lighting device can pass through the mirror surface. The term "rearview element" can also be used to designate an electronic display which performs the function of a conventional glass mirror.

The light element can, for example, be an LED, or else a different light source, which is preferably adapted to emit light in a wavelength range of 350 nm to 750 nm.

In one example, the at least one reflecting element comprises a reflective, in particular highly reflective, material, or is coated with a reflective, in particular highly reflective material, and/or the at least one reflecting element has a light-scattering surface structure on its surface facing at least one light element, and/or the at least one reflecting element is comprised by the support element or is connected, in particular detachably, to the support element.

For example, the reflecting element can contain an element from a group consisting of aluminum, silver, chromium, nickel, and alloys thereof. It can have a thickness of 0.1 to 1.0 mm, for example. Furthermore, the at least one reflecting element can be attached to a substrate. The substrate can have, for example, a thickness of 0.1 to 1.0 mm. The substrate can be made of a plastic material or a metallic material. The at least one reflecting element can be attached to the entire surface of the support element or only to a specific region of the surface of the support element. The at least one reflecting element can be attached to the entire surface of the light guide element or only to a specific region of the surface of the light guide element. Preferably several reflecting elements are included. The term "reflecting element" can also be used to designate a reflecting element that is attached directly to the surface of the support element or the light guide element—that is, without a substrate.

For example, the reflecting element can be implemented in a selective coating process. However, the at least one reflecting element can also be arranged on the support element or the light guide element by means of a chemical connection, such as, for example, an adhesive connection. Alternatively, a welded connection or a clip connection can also be used.

The lighting device according to a first exemplary embodiment also has at least one absorption element which is provided on or in the support element of the lighting device and is adapted to absorb incident light from the light element. For example, the absorbing element can have a black dye. It can have a thickness of 0.1 to 1.0 mm, for example. The at least one absorption element can be attached to the entire surface of the support element or can be attached only to a specific region of the surface of the support element. For example, the at least one absorption element can be attached to a substrate. The substrate can have, for example, a thickness of 0.1 to 1.0 mm. It can consist of a plastic material or of a metallic material. Preferably, a plurality of absorption elements is arranged on the support element of the lighting device. The term "absorption element" can also be used to designate an absorption element which is attached directly to the surface of the support element—that is, without a substrate. It is also possible, for example, for one or more absorption elements to be attached to one or more reflecting elements.

Advantageously, faulty light can be eliminated in a lighting device in which only the light-relevant surfaces have reflecting elements. As such, with a corresponding arrangement of the reflecting elements, the absorption elements and the at least one light element, a visual display, which can be a (warning) light, can be created with a sharp contour. At the same time, the luminous contour of the (warning) lights can be visible only from certain directions.

In one example, the support element is curved and the at least one reflecting element and/or the at least one absorption element is/are arranged on a concavely curved inner surface of the support element. Advantageously, the incident light of the light element can be emitted bundled due to the concave design of the support element and the reflecting and absorption elements arranged accordingly thereon. By means of a grained surface of the reflecting and/or absorption elements, the illumination region can thereby be slightly enlarged, the appearance improved and/or undesirable scattered light avoided.

In one example, the at least one reflecting element and/or the at least one absorption element has a curvature which preferably corresponds substantially to the curvature of the support element. Advantageously, the at least one reflecting element and the at least one absorption element can thus be attached directly on the curvature of the support element. For example, the substrate and/or the reflecting element and/or the absorption element can be designed to be flexible and/or designed with a corresponding curvature for this purpose.

According to a second embodiment, for example, a light guide element is used instead of an absorption element, which has a curved surface on its side opposite the light element. In this case, the reflecting element can actually be provided by the light guide element itself. Specifically, if the light guide element is made of a dielectric material such as PMMA, there is a reflection of the light coupled into the light guide element at the interface between the light guide element and the ambient air on the opposing surface. The curvature results in light bundling.

A grained surface of the reflecting element results in a more uniform appearance. In addition, extraneous light which emerges from the light guide element can be reduced, for example, with a grained surface of an absorption element.

Advantageously, a—particularly exchangeable—cover element and/or diaphragm element is included which is light-permeable in at least one region and/or has an opening in at least one region, wherein preferably the light-permeable region and/or opening determines a—particularly modifiable—illumination contour of the lighting device For example, the cover element and/or diaphragm element can have a flat disk-shaped surface and can be designed in such a manner that it can be attached to the support element. The cover element and/or diaphragm element can be made of the same material as the support element and can be connected to the support element. For example, the at least one light element can be attached to the cover element and/or diaphragm element and designed to illuminate the surface of the support element.

Furthermore, the cover element and/or the diaphragm element can have an opaque and/or reflective coating on its inner side which faces the support element, said coating being interrupted in certain regions, such that light can pass through these regions. For example, these regions can have the geometry of a symbol to be displayed to a driver. For example, the symbol can be a letter, a warning triangle, etc. Alternatively or additionally, the cover element can also have an opening, which can also be referred to as diaphragm, through which light can pass. A desired illuminating contour can be advantageously achieved in this manner.

In one example, the cover element is adapted to cover the region curved by the support element, preferably to tightly cover the same from moisture, dust and/or extraneous light.

It can be advantageous if the at least one absorption element is at least partially reflective, such that faulty light can be prevented more efficiently. Alternatively or cumulatively, the at least one reflecting element can be at least partially absorbing, such that extraneous light can be avoided more efficiently. For example, a clear geometrical boundary between the reflecting and absorbing regions leads to a sharp brightness edge in the illumination.

Further optical elements can be arranged upstream and/or downstream of the reflecting, absorption and/or light guide elements. For example, the light propagation can be influenced in a specific manner using prisms, optics and/or microoptics.

Finally, the invention also suggests a rearview device of a vehicle, preferably of a motor vehicle, having a lighting device according to the invention.

In one example, the rearview device has at least one rearview element, wherein the at least one rearview element has a mirror element and/or a camera and/or an electronic display.

BRIEF DESCRIPTION OF THE SEVERAL VIEWS OF THE DRAWINGS

Further features, details and advantages of the invention are found in the following description, in which embodiments of the lighting device according to the invention are explained with reference to schematic drawings, wherein:

FIG. 1 illustrates a schematic sectional view of a lighting device known from the prior art;

FIGS. 2a and 2b each show a schematic sectional view of a first and second lighting device with a reflecting element and an absorption element, the reflecting element being attached directly to a support element, and alternatively to a substrate;

DETAILED DESCRIPTION OF THE INVENTION

Figure 3:
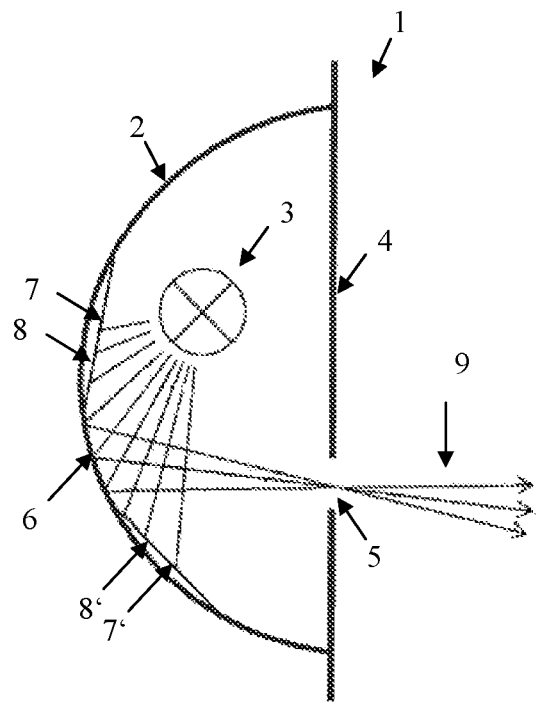
FIG. 3 shows a schematic sectional view of a third lighting device according to the invention, with two absorption elements and a reflecting element.

FIG. 1 shows a schematic view of a lighting device 100 known from the prior art. The lighting device 100 known from the prior art comprises a curved support element 102, wherein a reflecting element 106 is attached to the complete inner surface thereof. The curved support element 102 is closed off by an opaque cover element 104 which has an opening 105. A light element 103 which emits light onto the curved support element 102 is positioned in the space formed by the curved support surface 102 and the cover element 104. The light is reflected by the reflecting element 106 onto the support element 102, and exits through an opening 105 in the cover element 104.

FIGS. 2a and 2b each show a schematic view of a first and second lighting device 1 according to the invention, having a reflecting element 6 and an absorption element 7, the reflecting element 6 being attached directly to a curved support element 2 according to FIG. 2a, and alternatively to a substrate 8 according to FIG. 2b.

In contrast to the known lighting device 100, in the lighting device 1 of FIG. 2a, the reflecting element 6 is limited to a specific region of the curved support element 2, on the one hand, and on the other hand the absorption element 7 is attached to the rest of the inner surface of the curved support element 2. In addition, the reflection and/or absorption element can have at least one grained surface.

Since light from a light element 3 is absorbed by the absorption element 7, and is reflected only in the region of the reflecting element 6, it is ensured that only the light from the light element 3 which is reflected in the specific region of the reflecting element 6 emerges through an opening 5 in a cover plate 4. This is shown by the light beams 9 in FIG. 2a.

The lighting device 1 shown in FIG. 2b differs from the lighting device 1 shown in FIG. 2a not only in that the reflecting element 6 is attached to the substrate 8, which in turn is attached to the curved support element 2, but also in that the absorption element 7 is attached to the complete inner surface of the curved support element 2. Alternatively, the support element 2 can also function as the absorption element.

FIG. 3 shows a schematic view of a third lighting device 1 according to the invention, having two absorption elements 7, 7' and a reflecting element 6. FIG. 3 again shows that a reflecting element 6 is attached to a specific region of the curved support element 2 in such a manner that only the light beams 9 from the light element 3 which are reflected in the specific region emerge through the opening 5 in the cover element 4. In this case, the specific region is limited by the two absorption elements 7, 7', which are each attached to a substrate 8, 8' in the curved support element 2, such that the region which reflects light from the light element 3 can be determined by the position of the absorption elements 7, 7'. As such, the entire inner surface of the support element can be designed in such a manner that the support element 3 and the reflecting element can be provided as one integral component.

Figure 4:
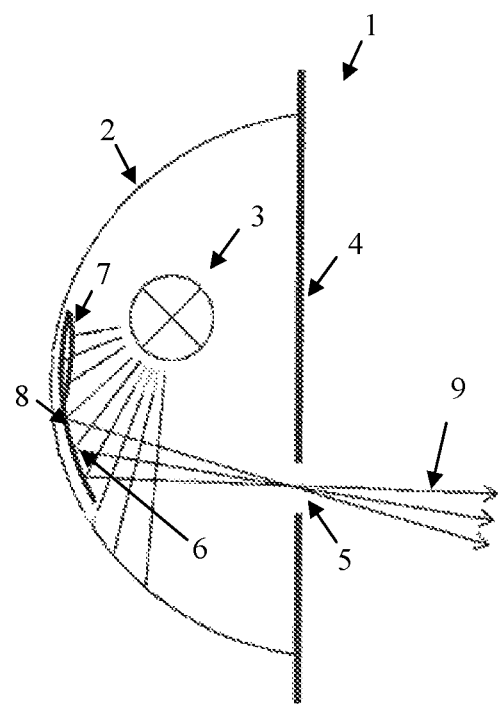
FIG. 4 shows a schematic sectional view of a fourth lighting device according to the invention, wherein the at least one reflecting element and the at least one absorption element are arranged on opposite sides of a substrate.

FIG. 4 shows a schematic view of a fourth lighting device 1 according to the invention, in which the at least one reflecting element 6 and the at least one absorption element 7 are arranged on opposite sides of a substrate 8. Before the substrate 8 is introduced into the curved support element 2, the expansion of the reflecting element 6 and of the absorption element 7 can be determined by bending or folding a part of the substrate 8.

Figure 5A:
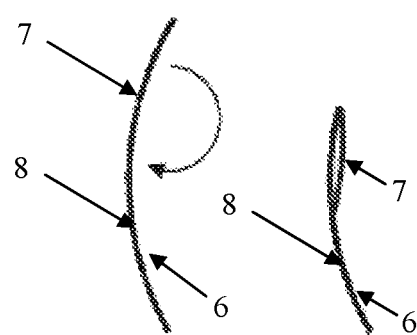
FIGS. 5a and 5b show schematic sectional views of a substrate, wherein the at least one reflecting element and the at least one absorption element are arranged on opposite sides of a substrate.
Figure 5B:
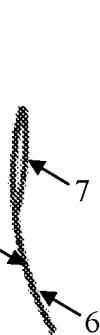

FIGS. 5a and 5b each show schematic views of the substrate 8, specifically before a bending, in FIG. 5a, and after a bending, in FIG. 5b. The at least one reflecting element 6 and the at least one absorption element 7 are arranged in this case on opposite sides of the substrate 8. At least one of the elements has a grained surface at least in parts thereof.

A person skilled in the art knows that the substrate 8 can also have a different geometry instead of a curvature. For example, the substrate 8 can also be planar. It is also known to a person skilled in the art that even more sides than only one side of the substrate 8 can be folded over. Depending on the intended application, a person skilled in the art would also arrange the substrate 8 with the absorption element 7 in the direction of the light element 3 in the support element 2, as an alternative to the examples shown in FIGS. 4, 5a and 5b.

Possible alternatives to FIGS. 2a, 2b, 3 and 4 can be produced by exchanging the absorption and reflecting elements. In the case of such an exchange, the areas hitherto displayed as luminous appear as dark, and vice-versa. Extraneous light would thus be undesirable only in a certain range, and would be suppressed only in this area. In addition, upstream and/or downstream optical elements can be used to direct the light to the target surface in accordance with the requirements of the reflecting elements and/or absorption elements.

Figures 6A, 6B:
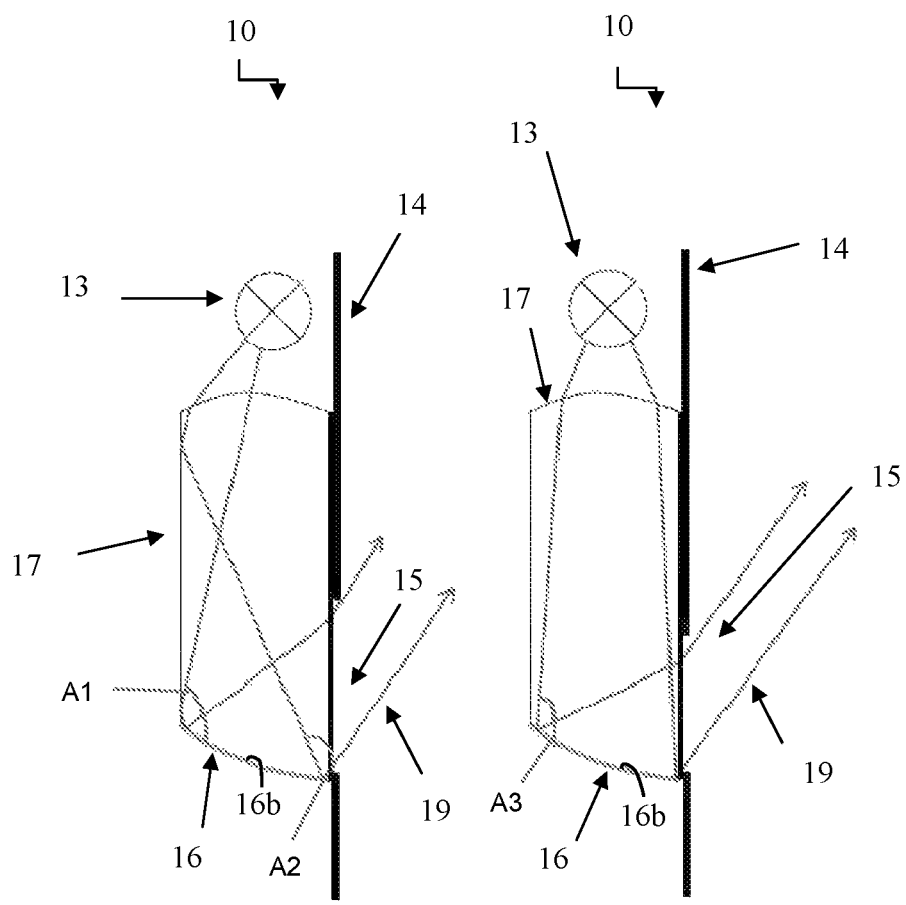
FIGS. 6a and 6b each show a schematic sectional view of a fifth lighting device according to the invention, with a reflecting element which is provided by a light guide element.

FIGS. 6a and 6b show a fifth lighting device 10 according to the invention, which comprises a light element 13, a diaphragm element 14 with an opening 15 and a reflecting element 16 as components of a light guide element 17. In contrast to the embodiments according to the invention described in connection with FIGS. 2a to 5b, no absorption element is included as a result. Rather, the light guide element is included, which fulfills a series of functions. Thus, the light guide element 17 performs the function of a support element, which carries the reflecting element 16 in its region which is curved away from the light element 13. Because the light guide element 17 is constructed from a dielectric material, a (total) reflection occurs at the interface between the dielectric material and the ambient air in the region, curved away, in which it comprises the reflecting element 16. The curvature in this region ensures that the light beams 19 coupled into the light guide element 17 pass through the opening 15.

At least one surface of the light guide element 17 has a grained surface for scattering the incident light. The grained surface can, for example, be located on the curved surface of the light guide element 17 which face away from the light element 13, which also carries the reflecting element 16, in order to produce a more uniform appearance. This could also be realized with a grained light exit surface, but the scattering thereon could potentially lead to undesired extraneous light. For example, surfaces of the light guide element 17 which couple light into the light guide element and/or guide it to the curved region can also be grained. As a result, the light is scattered by the reflecting element 16 even before strikes the curved region, which can lead to a more uniform appearance. An inner surface 16b of the reflecting element 16 of the light guide element 17, and in turn an inner surface 16b of the light guide element 17, which faces the incident light of the light element may have a concave curvature.

In addition, the light beams 19 are coupled into the light guide element 17, since a curvature is also provided on the side facing the light element 13. Both curvatures are matched to each other in such a way that the emerging light illuminates the desired region, but extraneous light is avoided.

In at least one aspect, with respect to the range of angles of the carrier means 2, the reflecting means 6, 16, the absorption means 7 and/or the light guiding means 17 relative to the optical axis of the light beam coming from the lighting means 3, 13 and impinging on the reflecting means 6, 16, the absorption means 7 and/or one of the faces of the light guide means 17, the range can be from 91° to 179° at most. That is, still referring to FIGS. 6a, 6b, and 6c, the obtuse angles A1, A2, and A3 between the surface of the reflecting means 6, 16 from the lighting means 3, 13 impinging thereon may range from 91° to 179°. This allows the light beam to pass through the opening 15 of the diaphragm element 14 at the ideal degree and with most or all of the light passing through the opening 15.

In addition, the preferred range of the obtuse angles A1, A2, or A3 is dependent upon the arrangement of the opening 15. In fact, the preferred obtuse angles A1, A2, or A3 depend on the arrangement of the opening 15 within the diaphragm element 14 relative to the carrier means 2, the reflecting means 6, 16, the absorption means 7 and/or the light guiding means 17, as well as on the dimensions of the opening 15. The dependency of the angles A1, A2, or A3 to the arrangement and dimensions of the opening 15 provides the ideal degrees that would allow most or all of the light to pass through the opening 15.

The light guide element 17 can be connected directly to the diaphragm element 14, which results in a particularly simple construction.

In addition to the curvatures mentioned, the light guide element 17 can also have inlet optics and/or outlet optics, and/or upstream optical elements and/or downstream optical elements in order to optimize the focusing of the light beams 19 onto a target surface, for example in the direction of the eye ellipse of a driver. At the same time, the illumination of the opening in the cover element and/or diaphragm element can be optimized with directional light beams to the target surface.

Another important aspect of the invention is a homogeneous illumination of the opening in the cover element and/or diaphragm element with directional light beams to the driver's eye ellipse.

The features disclosed in the foregoing description, in the drawings, as well as in the claims can be essential both individually and in any combination for the realization of the invention in its various embodiments.

LIST OF REFERENCE NUMBERS 1 lighting device
2 support element
3 light element
4 cover element
5 opening
6 reflecting element
7, 7' absorption element
8, 8' substrate
9 light beam
10 lighting device
13 light element
14 diaphragm element
15 opening
16 reflecting element
17 light guide element
19 light beam
100 lighting device
102 support element
103 light element
104 cover element
105 opening
106 reflecting element
109 light beam

What is claimed is:
1. A lighting device for a visual display in a rearview device of a vehicle, comprising:
at least one light element;
an exchangeable diaphragm element which is light-permeable in at least one region or has an opening in at least one region; and
at least one light guide element which functions as a support of the lighting device, and collects and guides incident light from the light element,
wherein the light guide element comprises at least four sides including a first curved side facing the light element and a second opposite curved side comprising a reflecting element,
wherein a light beam coming from the light element impinges on the reflecting element at an obtuse angle formed between the impinging light and a surface of the reflecting element ranging from 91 degrees to 179 degrees so that the light beam passes through the light-permeable region or the opening of the exchangeable diaphragm element, and wherein the exchangeable diaphragm element extends substantially parallel to a third side of the at least four sides, wherein the exchangeable diaphragm element is connected or connectable to the light guide element, or a housing is provided by the exchangeable diaphragm element and the light guide element which is tight or sealed.

2. The lighting device according to claim 1, wherein an inner surface of the reflecting element which faces the incident light of the light element has a concave curvature, or an inner surface of the light guide element which faces the incident light of the light element has a concave curvature, and wherein the concave curvature of the reflecting element or the light guide element is at least segmentally spherical or aspherical.

3. The lighting device according to claim 1, wherein an inner surface of the reflecting element or of the light guide element which faces the incident light of the light element is at least one of partially structured and grained, or an inner surface of the reflecting element or the light guide element which faces the incident light of the light element is at least partially a light-scattering surface.

4. The lighting device according to claim 1, wherein the reflecting element reflects at least 35% of the radiation power of the light of the light element incident thereon in a directed and/or diffuse manner.

5. The lighting device according to claim 1, wherein the exchangeable diaphragm element is adapted to opaquely cover a region curved by the light guide element, or the exchangeable diaphragm element has a reflecting surface on a side facing away from the light guide element.

6. The lighting device according to claim 1, wherein the dimension of the obtuse angle is dependent on a dimension or an arrangement of the light-permeable region or the opening.

7. A rear-view device of a vehicle having a lighting device according to claim 1.

8. The rearview device according to claim 7, further comprising at least one rearview element, wherein the at least one rearview element has a mirror element or a camera or an electronic display.

* * * * *